(12) United States Patent
Hull

(10) Patent No.: US 7,478,944 B2
(45) Date of Patent: Jan. 20, 2009

(54) SOIL MIXING APPARATUS WITH AUGER AND CHEMICAL INJECTION

(76) Inventor: Chuck Hull, 1 Saddle Ridge Rd., Newtown, CT (US) 06470

( * ) Notice: Subject to any disclaimer, the term of this patent is extended or adjusted under 35 U.S.C. 154(b) by 15 days.

(21) Appl. No.: 11/642,250

(22) Filed: Dec. 20, 2006

(65) Prior Publication Data

US 2008/0019213 A1    Jan. 24, 2008

Related U.S. Application Data

(60) Provisional application No. 60/832,001, filed on Jul. 19, 2006.

(51) Int. Cl.
*B01F 7/08* (2006.01)

(52) U.S. Cl. .............. 366/172.2; 366/182.4; 366/186

(58) Field of Classification Search .............. 366/50, 366/168.1, 172.2, 186, 266, 318, 603, 64–67, 366/96–99, 182.4, 194–196
See application file for complete search history.

(56) References Cited

U.S. PATENT DOCUMENTS

| | | | | |
|---|---|---|---|---|
| 1,607,713 A | * | 11/1926 | Wickey | 198/498 |
| 1,611,297 A | * | 12/1926 | Wickey | 366/35 |
| 1,623,001 A | * | 3/1927 | Gollbach | 111/11 |
| 2,074,988 A | * | 3/1937 | O'Brien et al. | 422/273 |
| 2,504,486 A | * | 4/1950 | Anderson | 366/181.3 |
| 3,734,777 A | * | 5/1973 | Bratschitsch | 134/132 |
| 4,079,696 A | * | 3/1978 | Weber | 118/417 |
| 4,551,024 A | * | 11/1985 | Clapp | 366/40 |
| 5,401,402 A | * | 3/1995 | Christy et al. | 210/205 |
| 5,494,351 A | * | 2/1996 | Hakasalo | 366/318 |

FOREIGN PATENT DOCUMENTS

| | | | | |
|---|---|---|---|---|
| FR | 2542214 A1 | * | 9/1984 | |
| FR | 2562393 A1 | * | 10/1985 | |
| JP | 56040425 A | * | 4/1981 | |

* cited by examiner

*Primary Examiner*—Charles E Cooley
(74) *Attorney, Agent, or Firm*—Sofer & Haroun, LLP

(57) ABSTRACT

A soil mixing apparatus for mixing soil and a media. The apparatus comprises a housing having a rotatable auger mounted longitudinally within the housing. The housing is provided with a first lower end, an intermediate section and a second raised end, the second raised end raised relative to said first lower end. A hopper is coupled to the first lower end of the housing so that the rotatable auger extends into the hopper for moving the soil toward the second raised end. A valve apparatus is coupled to the housing at the intermediate section of the housing for introducing the media to the soil as the soil is moved from the hopper to the second raised end. The rotatable auger is provided with a series of spaced flites so that the soil can be moved from the first lower end through the intermediate section and to the second raised end. An inlet water supply allows water to be introduced at the intermediate section. A treatment inlet supply allows an additive to be added to the soil at the intermediate section.

18 Claims, 5 Drawing Sheets

SOIL MIXING APPARATUS WITH AUGER AND CHEMICAL INJECTION

This application claims the benefit of priority from U.S. Provisional Patent Application No. 60/832,001, filed on Jul. 19, 2006, the entirety of which is incorporated by reference.

FIELD OF THE INVENTION

The invention relates to a soil mixing apparatus for mixing soil and a media, the apparatus having an inlet water supply and a treatment inlet supply.

BACKGROUND OF THE INVENTION

Mixing solids and liquids is well documented in the art. Mixers are often used to mix solids with other solids and liquids. Solids generally refer to particles ranging in size from 1 micron to 2 centimeters. Liquids generally refer to incompressible materials having no shear modulus.

Mixers in the art introduce solids and liquids through a series of stages in an apparatus, such as one stage at either an intermediate or end position. Solids in bulk raw material form are typically introduced to a hopper at the first stage of an apparatus. The hopper may have agitation to assist with transferring the solids from the hopper. The solids, after passing through the hopper, are transferred through different stages of the apparatus using one or more augers.

An auger is an axially rotatable screw feed. In the art, an auger is commonly used to feed solids into a mixer. The mixer may have an axially rotatable impellor for dispersing the solids throughout the liquids. The mixing process is often centrifugal, which creates a vacuum inside of the mixing device. The resulting mixture of solids and liquids is then drained or pumped from the mixer and used as either the end product or the material for the next step in the process.

The proper mixing of the solids into the liquids may depend upon differences in the amount of the solid present, its particle size, viscosity, or temperature. Proper dispersion also depends upon back pressure at the mixer outlet. In addition, the mixer itself may impede the mixing process. The mixer's centripetal force can create a vacuum that draws in solids at an uncontrollable rate, causing them to mix with the liquids at a variable supply rate.

Pnuematic conveying systems utilizing auger conveyor sections are also used in the art to transport various particulate materials, including pulverized coal, portland cement, grain, and pulverized ore. Typically, the conveying systems contain a motor driven auger rotatably mounted within a barrel, and a mixing chamber where the material is subjected to one or more jets of pressurized air or other gas.

Mixers joined in tandem are also known in the art, and frequently contain a dwell chamber between two mixing heads. Some mixing systems in the art are chemical reforming systems in which organic materials such as municipal waste or coal are chemically reformed from solid materials by pyrolysis in the presence of water to form oils and gasses.

Another area in which the process of mixing solids and liquids is utilized is in preparing soil or other media to be used for potted plants or gardening. Preparing soil mixtures containing fertilizer and/or insecticide that can be used to grow potted plants or placed in gardens involves a number of steps. Generally, bale or bulk media, such as soil, is broken up and then treated with fertilizer and/or insecticide. This treatment process frequently exposes operators to the various chemicals being used. Workers are often splashed with the various chemical treatments as they spray them into the bulk media.

In addition, commercial mixing apparatuses such as those discussed above, and examples of which are cited below, utilize heavy machines that are not easily moved from one location to another. Many of the devices in the art are specifically designed for chemical systems that do not handle heavier materials, such as soil. In addition, mixing soil with various fertilizers or chemicals is a delicate process often requiring a gentle action so as to not crush the vermiculite, which are minerals found in the soil that help plants absorb potassium.

One example of a prior art apparatus is found in U.S. Pat. No. 6,712,496 B2, issued Mar. 30, 2004 to Louis Alvin Kressin, et al. The Kressin et al. apparatus utilizes an auger to transport solids from a hopper to a mixer with a controlled delivery rate of the solids into the mixer without the need for an evacuation step. The apparatus receives solids at a hopper inlet and distributes them through a hopper outlet into a throat section containing an axially rotatable auger. The throat section has an outlet in communication with a mixer. The axial rotation of the auger moves the solids through the throat section and into the mixer. The delivery rate of the soil into the mixer is in proportion with the rotational speed of the auger. This reference deals primarily with achieving sufficient distribution of solids in a liquid.

Another example of a prior art apparatus is found in U.S. Pat. No. 5,500,120, issued Mar. 19, 1996 to David L. Baker. The Baker apparatus chemically reforms organic materials using a rotational tube positioned in a tubular housing, and a flow conduit system that allows fluid material within the housing to move between different access ports within the housing. The device allows various raw materials to be chemically reformed.

A third example of a prior art apparatus is found in U.S. Pat. No. 4,438,072, issued Mar. 20, 1984 to Joseph L. Nothnagel. The Nothnagel apparatus discloses a mixing device containing a reverse-twist auger located within a dwell chamber. The device incorporates a number of valves and conduits to supply reactants to liquid within the dwell chamber, allowing for component mixing and dwell time. The device also contains a dispensing valve and includes a means for cleaning the valve to prevent reactant buildup. The products, after leaving the dwell chamber, travel to a second mixing head and then a final valve, which releases the final product. This device focuses on allowing increased dwell time of mixtures without permitting a buildup of reactive material on the walls of the dwell chamber, and relates to polyurethane gels filled with particles of aqueous solutions.

A fourth example of a prior art apparatus is found in U.S. Pat. No. 4,711,607, issued on Dec. 8, 1987 to Charles Wynosky. The Wynosky apparatus discloses a conveying system that utilizes a hopper-fed auger section for transporting material through and toward the end of a barrel, and mixing said material with a pressurized gas flow. The auger conveyor section includes a cylindrical barrel enclosing a rotatably mounted auger conveyor for transporting particulate material towards a discharge end of the barrel and for ejecting the material. The invention inserts pressurized gas to help propel material through the conduit.

A fifth example of a prior art apparatus is found in U.S. Pat. No. 5,005,980, issued on Apr. 9, 1991 to Harold Zimmerman. The Zimmerman apparatus discloses a mixing machine that processes waste materials for disposal by mixing the waste with an inert material, such as soil. The apparatus receives waste and inert materials in separate hoppers and conveys them to a mixing chamber for uniform mixing in prescribed ratios. Each hopper contains augers that pull material away from the hopper to the mixing chamber, which also contains an auger. The material is discharged from the machine after passing through the mixing chamber. The apparatus is designed to be mounted on a trailer or permanently mounted on the ground. Each component of this machine is hydraulically driven to provide for independent operation.

A sixth example of a prior art apparatus is found in U.S. Pat. No. 7,069,677 B2, issued on Jul. 4, 2006 to Cheng-Feng Chang. The Chang apparatus discloses a method for producing a ready-mix soil material by crushing earth material from a work site, sieving the earth material to obtain raw soil, and mixing metered amounts of the soil with at least one strength enhancing additive. The resulting mixture is then used to refill a work site. The method also involves establishing a database for soil mix combinations and corresponding mechanical properties. This reference focuses on reducing discarded earth material at work sites by using the material to create refilling material.

None of these prior art devices teach or suggest a portable soil mixing apparatus for mixing soil and a media, the apparatus comprising a housing having a rotatable auger mounted longitudinally within the housing, the housing provided with a first lower end, an intermediate section and a second raised end with the second raised end raised relative to said first lower end. In addition, none of these prior art devices teach or suggest a soil mixing apparatus having a hopper coupled to the first lower end of the housing so that the rotatable auger extends into the hopper for moving the soil toward the second raised end, and a valve apparatus coupled to the housing at the intermediate section of the housing for introducing the media to the soil as the soil is moved from the hopper to the second raised end, said valve apparatus having an inlet water supply that allows water to be introduced at the intermediate section, and a treatment inlet supply that allows an additive to be added to the soil at the intermediate section.

BRIEF SUMMARY OF THE INVENTION

One embodiment of the invention comprises a soil mixing apparatus for mixing soil and a media. The apparatus utilizes a housing having a rotatable auger mounted longitudinally within the housing. The housing is provided with a first lower end, an intermediate section and a second raised end, the second raised end raised relative to said first lower end. A hopper is coupled to said first lower end of said housing so that the rotatable auger extends into the hopper for moving the soil toward the second raised end. A valve apparatus is coupled to the housing at the intermediate section of the housing for introducing the media to the soil as the soil is moved from the hopper to the second raised end. The rotatable auger is provided with a series of spaced flites so that the soil can be moved from the first lower end through the intermediate section and to the second raised end. An inlet water supply allows water to be introduced at the intermediate section. A treatment inlet supply allows an additive to be added to the soil at the intermediate section.

A further object of the invention is to provide a soil mixing apparatus having a rotatable auger to incorporate water, fertilizer and/or insecticide into a potting media, which can be in bale form or in bulk. The bale or bulk potting media is placed in the hopper, and the rotatable auger rotates to provide a gentle blending action that breaks up clumps of the bulk potting media.

Another benefit of the invention is to prevent crushing of the vermiculite, which is a vital component of the media.

A further object of the invention is the positioning of the hopper and first lower end of the housing such that the potting media is easily placed into the hopper, which is proximate to ground level.

Another object of the invention is that the second raised end of the housing is raised relative to the ground level so that the finished product can be loaded onto a cabinet at a typical work table or work surface height. In addition, the invention provides an adjustable soil mixing apparatus that allows the second raised end of the housing to be positioned to be used in conjunction with various different types of flat filling equipment as utilized in the industry.

A further object of the invention is to incorporate various liquids directly into the potting media, thus reducing exposure to the operator of these insecticides and/or fertilizers.

DETAILED DESCRIPTION OF THE INVENTION

Figure 1:
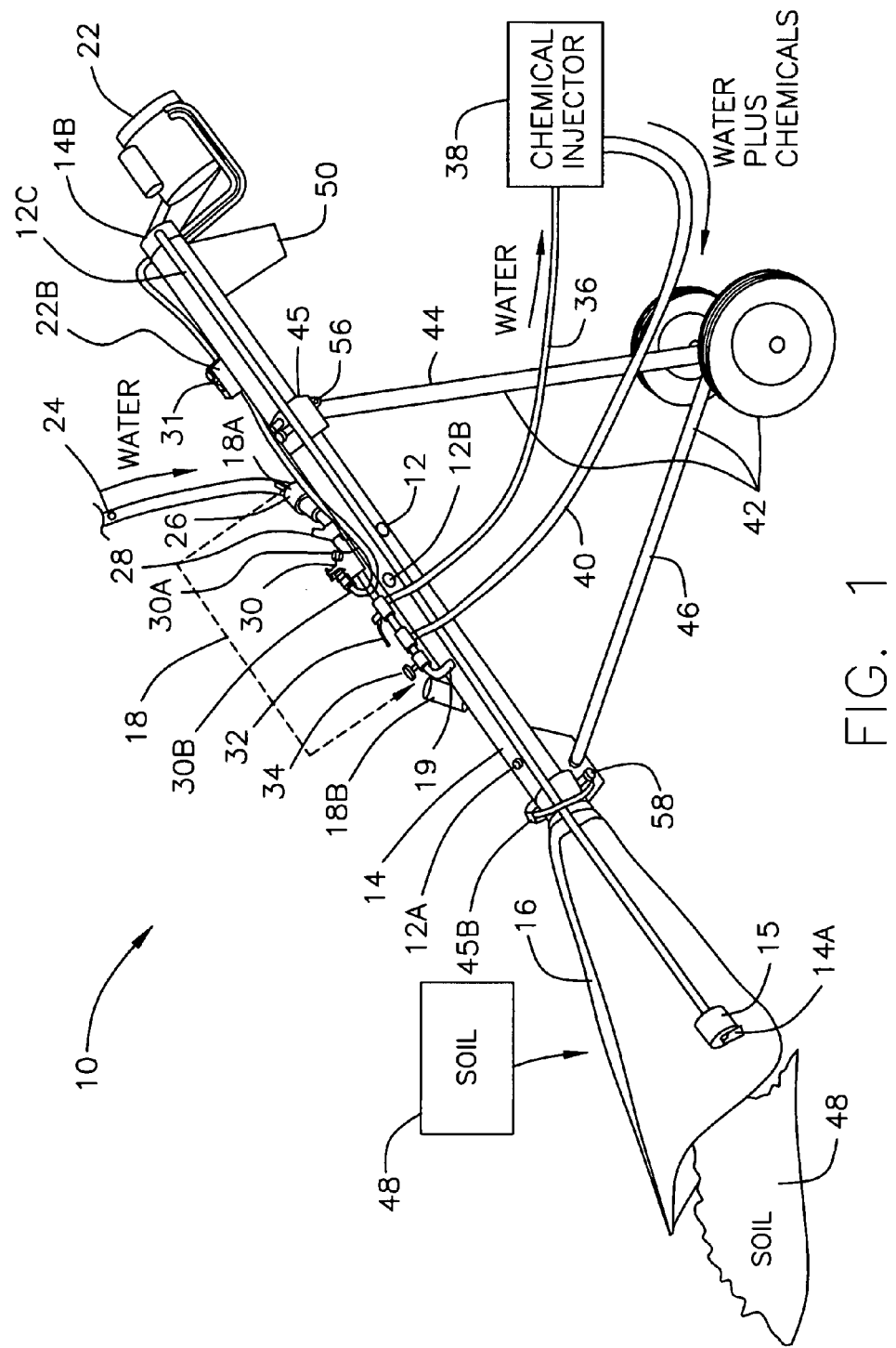
FIG. 1 is a side perspective view of the soil mixing apparatus, embodying various features of the present invention.
Figure 2:
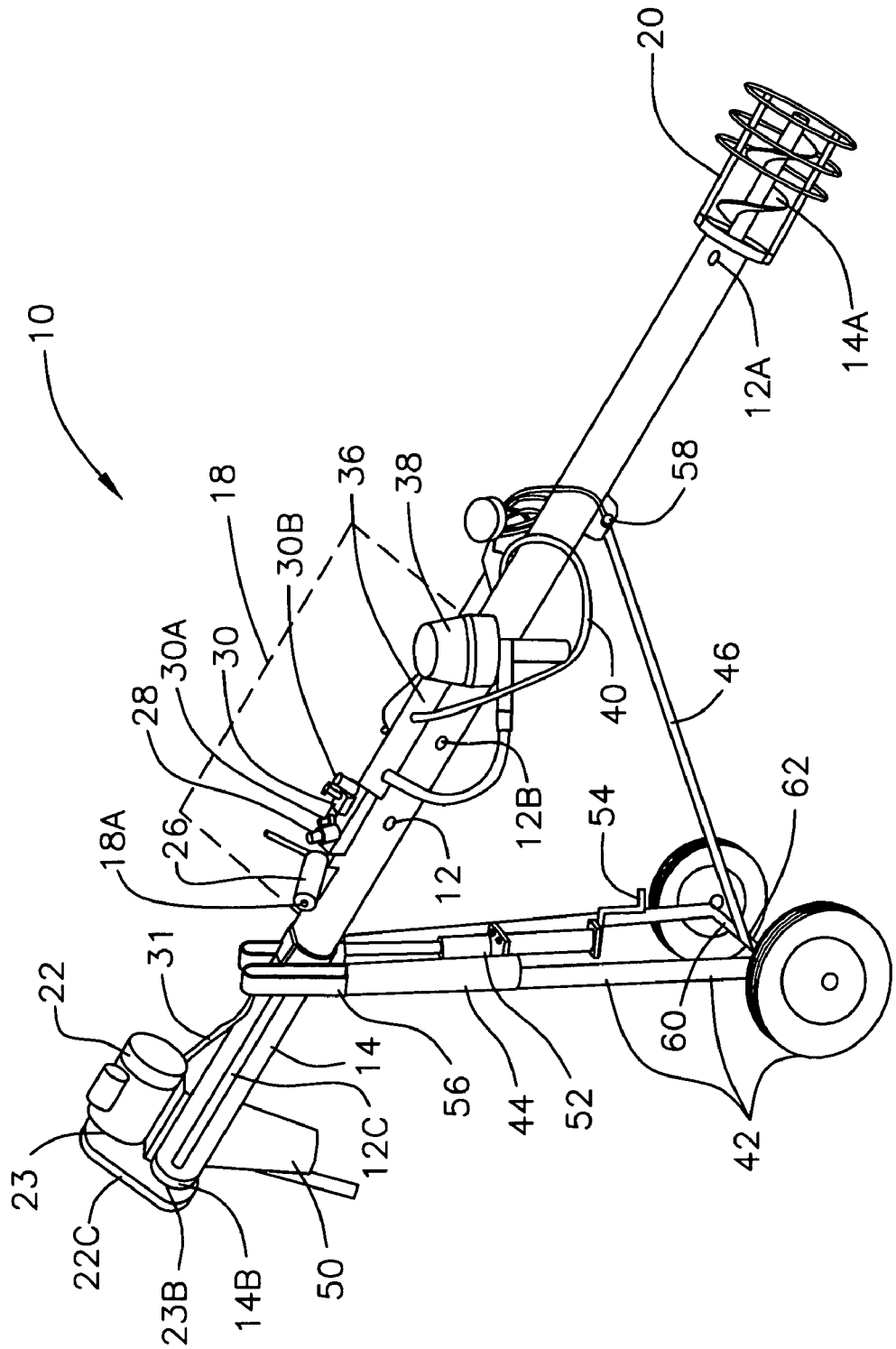
FIG. 2 is an opposite side perspective view of the valve apparatus of the soil mixing apparatus of FIG. 1.
Figure 3:
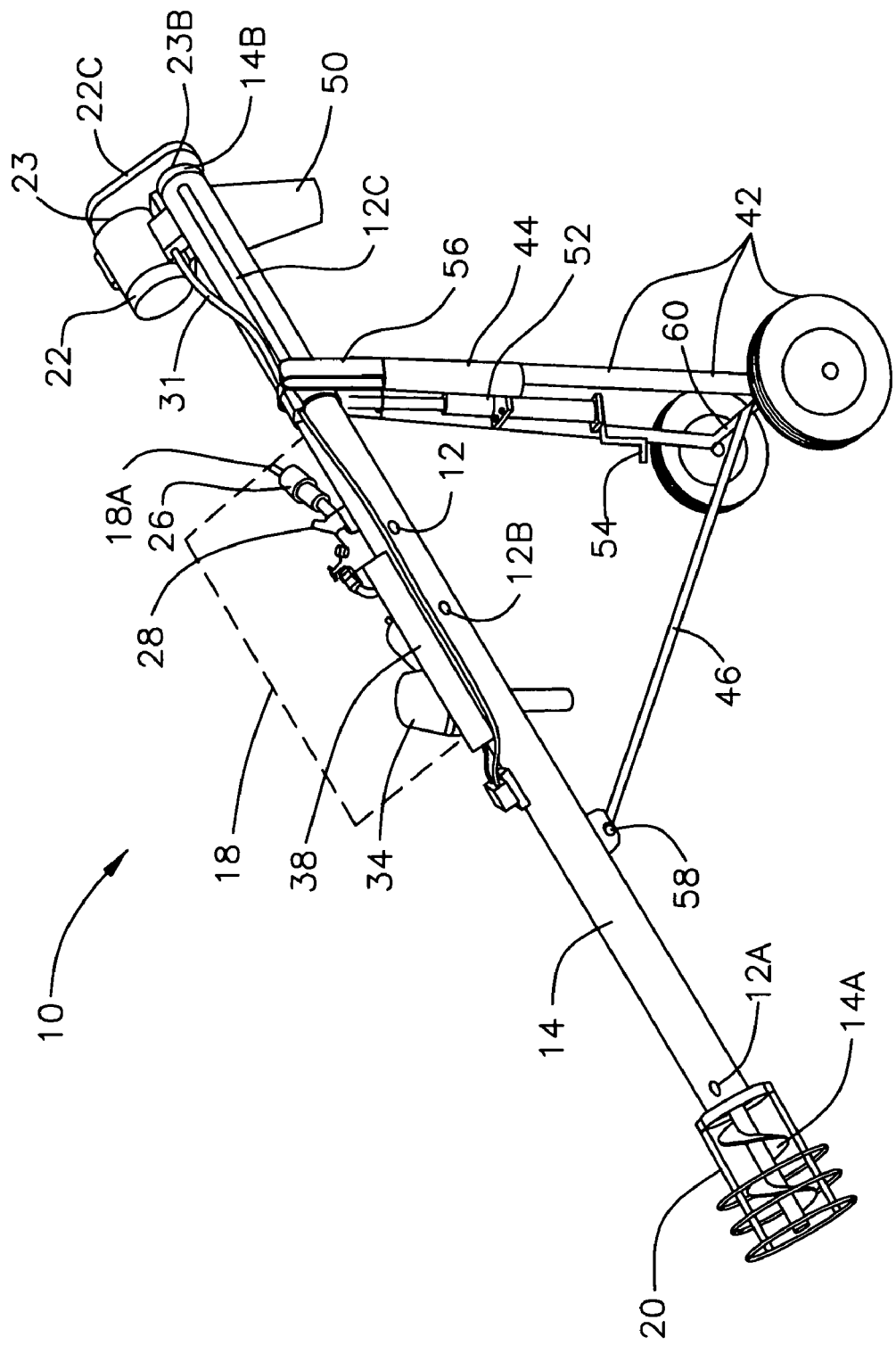
FIG. 3 is an additional side perspective view of the soil mixing apparatus of FIG. 1 showing the soil mixing apparatus in a raised position.
Figure 4:
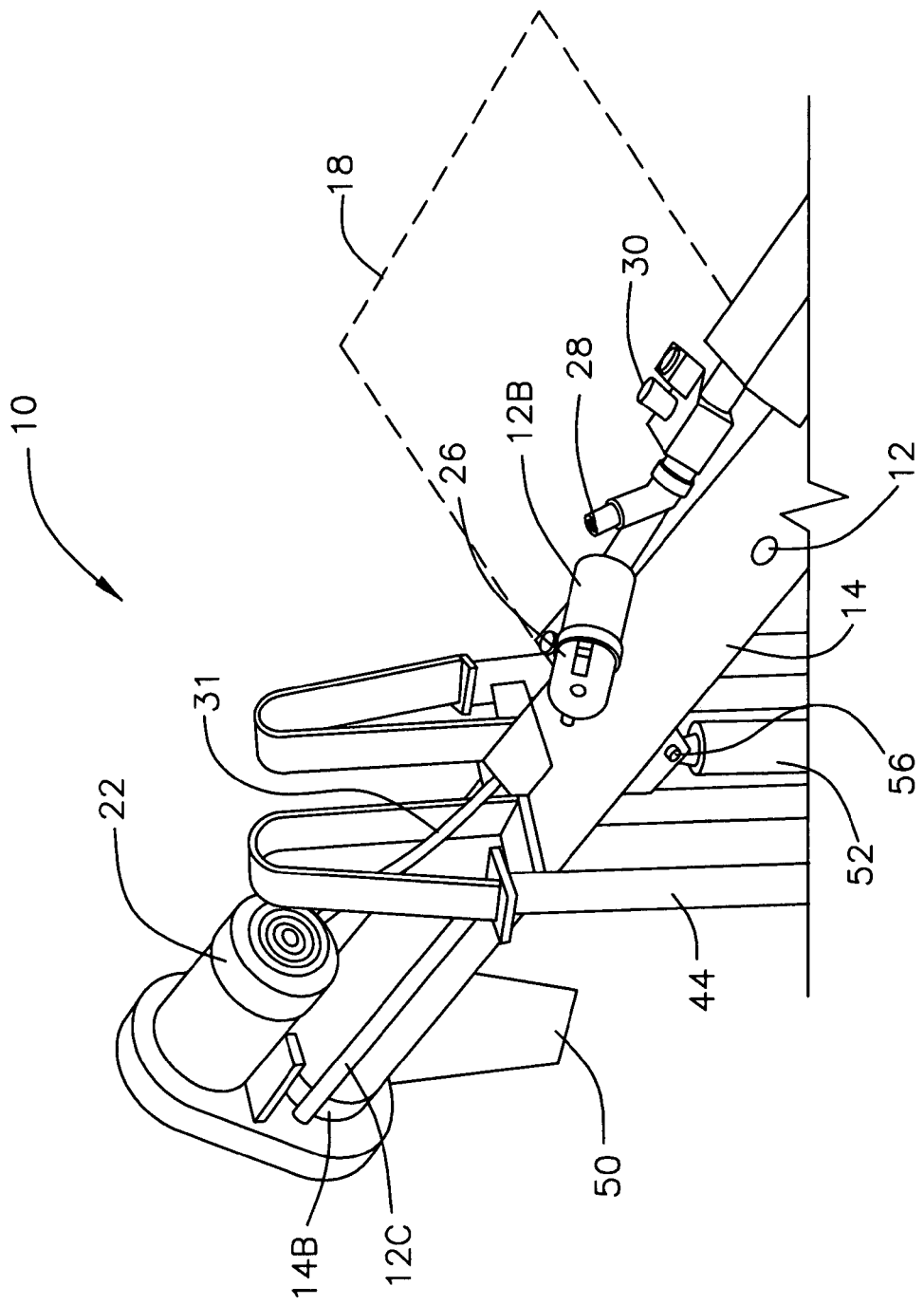
FIG. 4 is an additional side perspective view of the soil mixing apparatus of FIG. 1 showing the soil mixing apparatus in a lowered position.
Figure 5:
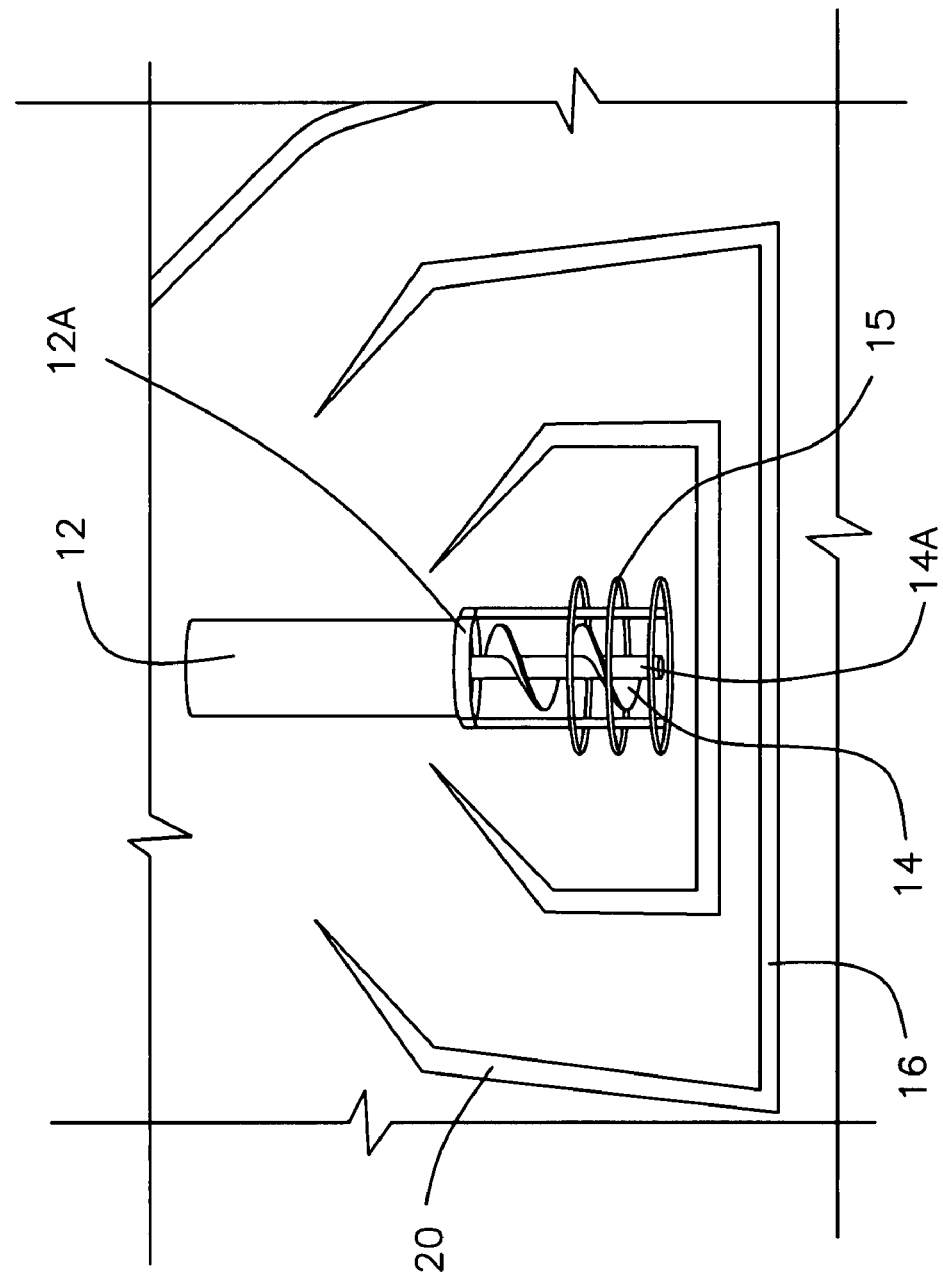
FIG. 5 is a front top perspective view of the housing, the hopper, and the first free end of the rotatable auger of the soil mixing apparatus of FIG. 1.

The soil mixing apparatus of the present invention is shown in FIGS. 1 through 5, and indicated generally by reference character 10. FIGS. 1 through 3 show side perspective views of a soil mixing apparatus 10 as positioned on a work surface or work area. Soil mixing apparatus 10 contains a housing or auger tube 12 having a first lower end 12a, an intermediate section 12b, and a second raised end 12c. A rotatable auger 14 is provided with a first free end 14a, as shown in FIG. 5, and a second end 14b, rotatable auger 14 being mounted longitudinally for rotation within housing 12. Also, as shown in FIG. 1, soil mixing apparatus 10 is provided with a hopper 16 which is coupled to first lower end 12a of housing 12 so that rotatable auger 14 extends into hopper 16.

A valve apparatus 18, as shown in its entirety in FIG. 1, is provided with first end 18a and second end 18b, valve apparatus 18 being mounted to intermediate section 12b of housing 12. In this way, valve apparatus 18 allows for the introduction of media to soil 48 at intermediate housing section 12b as soil 48 is first added to hopper 16 and then moved via auger 14 within housing 12 through intermediate section 12b and out through an outlet or discharge chute 50 located at second raised end 12c. Soil 48 is introduced to hopper 16 in the form of standard industry size bale compressed dry particle soil, typically of the type produced by Hyde Park and Earth Grow. Each bale is approximately 3.8 cubic feet and weighs approximately seventy-five to eighty pounds.

Valve apparatus 18 is connected to an inlet water supply 24 at first end 18a of valve apparatus 18. Inlet water supply 24 is a standard ⅜" garden hose. Valve apparatus 18 is provided with a water filter 26, a pressure regulator 28, a regulator valve 30 having a first side 30a and a second side 30b, a control valve 32, and a gate valve 34. Regulating circuit 31 connects a motor 22 to regulator valve 30 via switch 22b. Motor 22 runs at a constant speed of 1,728 RPM, and, as shown in FIGS. 2 and 3, is connected to a belt 23 that turns a pulley 23b connected to second end 14b of rotatable auger 14.

When motor 22 is turned on, switch 22b is on, which maintains regulator valve 30 in an open position, allowing inlet water supply 24 to flow through valve assembly 18. When motor 22 is turned off, switch 22b turns off, which closes regulator valve 30 and stops inlet water supply 24 from flowing through valve assembly 18. Water inlet supply 24 is adjusted by gate valve 34, which when turned changes the rate of flow of water inlet supply 24 through valve apparatus 18. Water filter 26 is standard ¾" 35 PSI and regulator valve 30 is 1" 110 Volt.

As shown in FIGS. 1 and 2, a treatment outlet supply 36 is mounted to valve apparatus 18 at second side 30b of regulator valve 30. Treatment outlet supply 36 connects to a chemical injector 38. DosMatic and Dositron chemical injectors are recommended as they are more user friendly. A treatment inlet supply 40 is mounted to valve apparatus 18 between control valve 32 and gate valve 34. Treatment inlet supply 40 connects to chemical injector 38. Water inlet supply 24 is routed to chemical injector 38, and thus becomes treatment outlet supply 36, when control valve 32 is placed in the closed position. Treatment outlet supply 36 passes through chemical injector 38, which is typically a Dosimatic injector as manufactured by Dosmatic U.S.A. of Carrollton, Tex., that utilizes a water actuator. As treatment outlet supply 36 enters chemical injector 38, a spring loaded bladder is filled, which adds various chemicals and ejects treatment inlet supply 40 at a constant rate.

Chemical injector 38 is accurate for water speeds varying between 4 gallons per minute and 20 gallons per minute, though a maximum flow rate of eleven gallons per minute is recommended. Chemical injector 38 supplies various insecticides and water soluble fertilizers to treatment outlet supply 36 and ejects the resulting mixture as treatment inlet supply 40. Treatment inlet supply 40 then passes through gate valve 34 and through notch 19 in housing 12, where it mixes with soil 48 at notch 19 as it moves through intermediate section 12b toward second raised end 12c.

When control valve 32 is placed in an open position, water inlet supply 24 does not flow to chemical injector 38, but is directly routed to soil 48 at intermediate section 12b through notch 19 as soil 48 passes notch 19 as it moves through intermediate section 12b toward second raised end 12c. The distance from first free end 14a of rotatable auger 14 to notch 19 where water enters housing 12 is approximately 4'8".

As shown in FIG. 5, free end 14a of rotatable auger 14 is guarded by a guard 15, which assists in guiding soil 48 into housing 12. Rotatable auger 14 is provided with a number of flites 20 spaced approximately 5" apart. Flites 20 break up clumps of soil 48 as it is driven through intermediate section 12b of housing 12. The space between the outer edge of the flites 20 and the housing 12 is approximately ¾", which allows clumps of soil 48 to ride on the top of rotational auger 14 between rotational auger 14 and housing 12. The clumps of soil 48 riding on top of rotational auger 14 fall down into rotational auger 14 as soil 48 is transported from first end 12a to intermediate section 12b. The spacing of flites 20 and the space between rotational auger 14 and housing 12 allows soil 48 to be broken up without crushing vermiculite present in soil 48 as soil 48 is transported to intermediate section 12b. Rotatable auger 14 is notched out 2" wide and 1" deep at notch 19 where water enters housing 12.

FIG. 3 shows soil mixing apparatus 10 in the raised position. A jack 52 attaches to housing 12 and a first arm 44 of a wheel assembly 42. A crank 54 is attached to jack 52 and is used to raise and lower housing 12 at second end 12c, allowing the height of a discharge chute 50 relative to the ground to be adjusted. Jack 52 allows for approximately 13" of vertical travel of discharge chute 50. As housing 12 is lowered with jack 52, housing 12 pivots at a first point of attachment 56 to first arm 44 and at a second point of attachment 58 to a second arm 46 of wheel assembly 42. Second arm 46 also pivots at a third point of attachment 60 to an axle 62 of wheel assembly 42. FIG. 4 shows soil mixing apparatus 10 in the lowered position.

The invention claimed is:

1. A soil mixing apparatus for mixing soil and a media, said apparatus comprising:
   a housing having a rotatable auger mounted longitudinally within said housing, said housing having a first lower end, an intermediate section and a second raised end raised relative to said first lower end;
   a hopper coupled to said first lower end of said housing so that said rotatable auger extends into said hopper for moving the soil toward said second raised end; and
   a valve apparatus coupled to said housing at said intermediate section of said housing for introducing media to the soil as the soil is moved from said hopper to said second raised end, said valve apparatus further comprising:
   an inlet water supply for introducing water to the soil at said intermediate section;
   a treatment outlet supply; and
   a treatment inlet supply for providing a treatment, said treatment outlet supply and said treatment inlet supply mounted on said valve apparatus so that said inlet water supply may be treated with various chemicals and introduced into said housing to be combined with said soil as said soil is moved toward said second raised end.

2. The soil mixing apparatus of claim 1, wherein said rotatable auger is provided with a series of spaced flutes so that the soil is moved from said first lower end, through said intermediate section and to said second raised end.

3. The soil apparatus of claim 1, further comprising a motor coupled to said rotatable auger for rotating said rotatable auger.

4. The soil apparatus of claim 3, further comprising a regulator valve for regulating said inlet water supply, and a regulating circuit connecting said motor with said regulator valve such that the flow of said inlet water supply through said valve assembly is contingent on said motor being on.

5. The soil apparatus of claim 1, wherein the treatment is an insecticide.

6. The soil apparatus of claim 1, wherein the treatment is a fertilizer.

7. The soil apparatus of claim 1, further comprising a control valve mounted between said treatment outlet supply and said treatment inlet supply for controlling the amount of treatment introduced into said housing.

8. The soil apparatus of claim 1, wherein said second raised end is provided with a discharge chute for discharging said treated soil.

9. The soil apparatus of claim 1, further comprising a wheel assembly connected to said housing, so that said soil mixing apparatus is movable.

10. The soil apparatus of claim 1, wherein said housing is inclined at an angle of approximately 25-45 degrees relative to the ground.

11. The soil apparatus of claim 10, wherein the height of said housing is adjustable so that said angle of incline of said housing may be varied between 25-45 degrees.

12. The soil apparatus of claim 1, wherein said housing is an enclosed cylinder.

13. A soil mixing apparatus for mixing soil, water and a fertilizer, said apparatus comprising:

a housing having a rotatable auger mounted longitudinally within said housing, said housing having a first lower end, an intermediate section and a second raised end raised relative to said first lower end;

a hopper coupled to said first lower end of said housing so that said auger extends into said hopper for moving soil toward said second raised end;

a valve apparatus coupled to said housing at said intermediate section of said housing for introducing water to said soil as said soil is moved from said hopper to said second raised end, said valve apparatus further comprising a fertilizer outlet supply and a fertilizer inlet supply for mixing fertilizer with said water, such that said fertilizer and said water may be introduced to said soil at said intermediate section of said housing.

14. The soil mixing apparatus of claim 13, wherein said rotatable auger is provided with a series of spaced flutes so that the soil is moved from said first lower end, through said intermediate section, and to said second raised end.

15. The soil apparatus of claim 13, further comprising a motor coupled to said rotatable auger for rotating said rotatable auger.

16. The soil apparatus of claim 13, wherein said valve apparatus further comprises an insecticide outlet supply and an insecticide inlet supply for mixing insecticide with said water such that said insecticide and said water may be introduced to said soil at said intermediate section of said housing.

17. The soil apparatus of claim 13, further comprising a control valve mounted between said fertilizer outlet supply and said fertilizer inlet supply for controlling the amount of fertilizer introduced into said housing.

18. The soil apparatus of claim 13, wherein said second raised end is provided with a discharge chute for discharging said treated soil.

\* \* \* \* \*